United States Patent Office 3,231,564
Patented Jan. 25, 1966

3,231,564
p-CHLOROBENZYL 1-AZIRIDINECARBOTHIOATE
Richard A. Nyquist, Midland, Mich., assignor to The
Dow Chemical Company, Midland, Mich., a corporation of Delaware
No Drawing.   Filed Oct. 17, 1963, Ser. No. 317,059
1 Claim.   (Cl. 260—239)

The present invention is concerned with the organic chemical compound, S-p-chlorobenzyl 1-aziridinecarbothioate. The present compound is of the formula

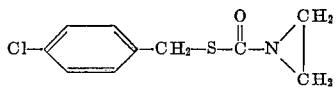

The present compound is a brown solid, of limited solubility in water, and relatively soluble in acetone, carbon tetrachloride and carbon disulfide. The compound has a molecular weight of 227.7, and yields a distinctive infrared spectrum. The compound is useful as a nematocide, fungicide, as an additive to natural body of water for the kill of unwanted trash fish, and useful as an additive to soil for the improvement of the physical properties of the soil as a building material and the like.

The present compound is prepared by a reaction between the S-p-chlorobenzyl ester of chlorothioformic acid and ethylene imine (otherwise called aziridine). The reaction is represented by the equation

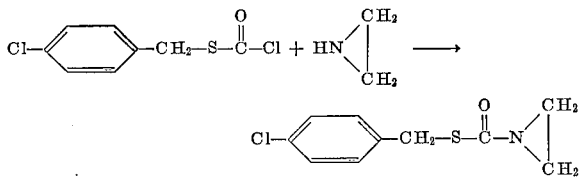

The reaction consumes 1 molecular quantity of ethylene imine for each molecular quantity of said ester. Hydrogen chloride of reaction is evolved, and 1 additional molecular equivalent of ethylene imine can be employed as hydrogen chloride acceptor.

The reaction is conveniently carried out in an inert liquid reaction medium which can be carbon tetrachloride.

The useful properties of the present compound are obtained when employing unpurified product. When desired, the compound can be purified in known manner, such as by taking up the substance in a hot solvent liquid and precipitating it therefrom by chilling.

The following example illustrates the present invention.

5 grams of S-p-chlorobenzyl ester of chlorothioformic acid and 1.95 grams of ethylene imine were mixed and blended intimately together in approximately 100 milliliters carbon tetrachloride, all said substances being initially at room temperature. The resulting reaction mixture was maintained at autogenous temperature and stirred continuously for approximately 3 hours to carry the reaction to completion. Thereafter, the resulting reaction mixture was washed with repeated separate portions of distilled water, and the washed organic substance remaining placed in an evaporating dish over a steam bath and warmed to vaporize and remove carbon tetrachloride reaction medium. As a result of these operations, there was obtained a brown solid S-p-chlorobenzyl 1-aziridine carbothioate product of the formula

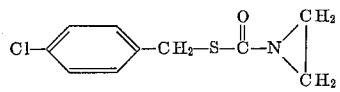

having a molecular weight of 227.7. An infrared spectrum of the product was taken, and analyzed for group frequencies and linkages, and supported the assigned structure.

The product was tested in a body of natural water populated with healthy, northern fatheaded minnows (*Pimephales p. promelas*). The median lethal dose of the present substance as sole toxicant was achieved at a concentration of 1 part of the said substance per million parts by weight of water. In contrast, at 10 times the said concentration, the substance was essentially without effect, after three weeks exposure, upon a mixed population of representative temperate zone aquatic weeds.

In an aqueous culture supporting a heavy population of root-knot nematodes, the addition of the present substance in the amount of 10 parts by weight per million parts by weight of nematode culture resulted in a kill assayed, by microscopic count, as 80 percent of the nematode population.

In either instance, the employment of larger amounts promptly gives kill of a higher proportion of the said populations.

When intimately admixed with soil typically susceptible of water-washing, shrinkage, cracking and the like, the present substance acts to stabilize the soil mechanically and improve its mechanical properties for cultivation to establish tilth, and as a foundation material under buildings and the like.

I claim:

The S-p-chlorobenzyl 1-aziridinecarbothioate of the formula

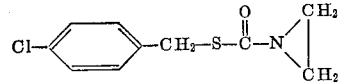

References Cited by the Examiner

UNITED STATES PATENTS

| | | | |
|---|---|---|---|
| 2,775,587 | 12/1956 | Fischback et al. | 260—239 |
| 2,802,824 | 8/1957 | Tolkmith et al. | 260—239 |
| 2,886,538 | 5/1959 | Chance et al. | 260—239 |
| 2,992,091 | 7/1961 | Harman et al. | 260—455 |

OTHER REFERENCES

Richter's Organic Chemistry (New York 1947), pages 4–5.

NICHOLAS S. RIZZO, *Primary Examiner.*

JOHN D. RANDOLPH, WALTER A. MODANCE,
*Examiners.*